United States Patent [19]

van der Landen

[11] 4,025,976
[45] May 31, 1977

[54] SUBMARINE PIVOTING STRUCTURE WITH DUCTING

[75] Inventor: Arie van der Landen, Zwijndrecht, Netherlands

[73] Assignees: Ingenieursbureau Marcon (Marine Consultants) B. V., The Hague; Koninklijke Fabrieken Penn & Baudin B. V., Dordrecht; Vredestein Loosduinen B. V., The Hague, all of Netherlands

[22] Filed: Feb. 17, 1976

[21] Appl. No.: 658,937

[30] Foreign Application Priority Data

Feb. 17, 1975 Netherlands ...................... 7501851

[52] U.S. Cl. .................................... 9/8 P; 141/388
[51] Int. Cl.² ........................................ B63B 21/52
[58] Field of Search ................ 9/8 P, B R; 114/230; 141/387, 388; 61/93–95, 98, 100

[56] References Cited

UNITED STATES PATENTS

| | | | |
|---|---|---|---|
| 3,774,253 | 11/1973 | Lecomte | 9/8 P |
| 3,883,912 | 5/1975 | Pederson | 9/8 P |
| 3,908,212 | 9/1975 | Van Heijst | 9/8 P |

FOREIGN PATENTS OR APPLICATIONS

| | | | |
|---|---|---|---|
| 2,131,200 | 4/1971 | Germany | 9/8 P |

*Primary Examiner*—Trygve M. Blix
*Assistant Examiner*—Stuart M. Goldstein
*Attorney, Agent, or Firm*—Sughrue, Rothwell, Mion, Zinn & Macpeak

[57] ABSTRACT

A flexible, universal coupling structure for underwater oil lines including an anchored base 1 having upstanding bracket plates 2 defining a horizontal axis 4 between them. A pivot piece 5 in the shape of an open tetrahedron is journalled about the axis 4, and at its upper end has lugs 6 defining a horizontal axis 7 above and perpendicular to the axis 4. A riser column 8–12 is pivoted about the axis 7. Oil or fluid carrying tubes 13 on the base branch into passages 15–18 which converge above axis 7 into tubes 9 and 10. Each passage includes flexible ducts 20, 22 joined by an intermediate curved and inclined tube 21, with the ducts 20 being aligned on axis 4 and and the ducts 21 being aligned on axis 7.

6 Claims, 3 Drawing Figures

FIG_1

SUBMARINE PIVOTING STRUCTURE WITH DUCTING

This invention relates to a submarine pivoting structure for connecting two structures in such a manner as to allow them to pivot in all directions, in which a number of ducts in each of said structures is connected mutually by duct parts in the pivoting structure.

All kinds of such structures are known. Often they have a universal joint structure in the usual way or a hollow spherical pivot through which one or more ducts pass or in which the hollow pivot itself acts as a duct part. If it is desired to have several ducts pass the pivoting structure this does not give particular difficulties if the ducts are flexible such as hoses, which may suspend freely over some distance in order to follow all the movements of the pivot. For more rigid ducts or for situations in which it is not possible or suited to have the duct suspend freely over an additional length there is the possibility to build the ducts in the pivoting structure concentrically one within the other. Moreover, a pivoting duct connection is known pivoting about one axis situated in the longitudinal direction of the duct in the pivoting structure, and this is also possible for several ducts meeting in a common body (e.g. Canadian patent specification No. 750,722). For a rotation in all directions such a pivot may be combined with a pivoting structure at some distance therefrom being of the same embodiment but pivoting about an axis perpendicular to the axis of the first pivot, each duct having two such pivots (U.S. Pat. No. 2,648,201).

Such structures often are not reliable and complicated, while they also suffer from the action of e.g. seawater. The checking of such structures at considerable depth is difficult and the structure may often jam or produce leakage e.g. of oil, which should be avoided at all costs.

In view of the above this invention in particular has for its object to provide a structure as indicated in the preamble above which is as favourable and as simple as possible and solves the problems and avoids the difficulties given above.

In view thereof a structure as given in the preamble is according to the invention characterized in that it has two pivoting axes crossing each other perpendicularly at some distance, that the ducts in the zone of each pivoting axis are positioned side by side and extend substantially perpendicularly to said pivoting axis and that the ducts each extend through both axes of pivoting as continuous separate structural units with short inclined connections in each duct between the areas thereof intersecting the pivoting axes.

In this way it is possible to have a larger number of ducts positioned in the same plane through each pivoting axis so that the ducts are only bent without being elongated or shortened with their centre-lines in pivoting, so that pivoting is possible without considerable stresses and without the necessity of a freely suspended flexible part.

The ducts in the areas of the pivoting axes are preferably embodied as flexible corrugated bellows.

It will be clear that the two pivoting axes should cross each other at such a distance that the ducts between such axes can adequately be led from their position in one pivoting axis to their position in the plane of the other pivoting axis.

When applying the invention it is possible to position the pivoting points of the structure in the pivoting axes somewhere between the ducts, but it is strongly preferred to do the reverse, i.e. to position the pivoting points in each pivoting axis at a considerable distance from each other and to have the ducts extend between said pivoting points.

When realizing the invention in this way it is preferable to apply a pivoting body which in essence has the shape of a partly open tetrahedron with a pivoting point in each corner.

Although when applying the invention the mechanical requirements as to tension and compression in each duct may be maintained low, it may be possible that the ducts have such diameters that it is difficult to give the the ducts, the desired flexibility. In such a case and also in the case in which, for safety reasons, the throughflow of gas or oil is preferably not fully closed when a bellows or another movable part of a duct will rupture, it is preferable according to the invention to split one or more ducts in the two structural parts to be connected in the vicinity of the pivoting structure into two parallel ducts, which thus may have a smaller diameter and which if desired may be provided with valves in order to use only one of said parallel ducts if the other one is damaged or is checked or replaced.

The invention is in particular adapted to be applied between an anchor block on the sea bottom below water and a column extending to a point above the water level with floating means and storing and discharging means for the fluids flowing through the ducts. This may be the case for loading and unloading buoys in open water, storage tanks in the vicinity of the waterlevel and discharge ducts e.g. stacks with combustion of waste products at the upper end in the atmosphere above the water, e.g. for newly made oil or gas wells.

For sake of completeness it is further known for single ducts such as for suction ducts of dredges to have two pivoting axes mutually perpendicular in the duct at a mutual distance, and it is also known to connect the pivoting points to a common pivoting body. In that case there is, however, only one duct which extends centrally between the pivoting points, and problems and purposes in such a case are entirely different from the case in the present invention. The pivoting points may for such dredges be connected to a rigid curvature piece, to which the duct is connected to both sides through a flexible hose part.

The present invention will now be explained in more detail with reference to the enclosed drawings giving by way of example one preferred embodiment of the invention. In said drawings.

Figure 1:
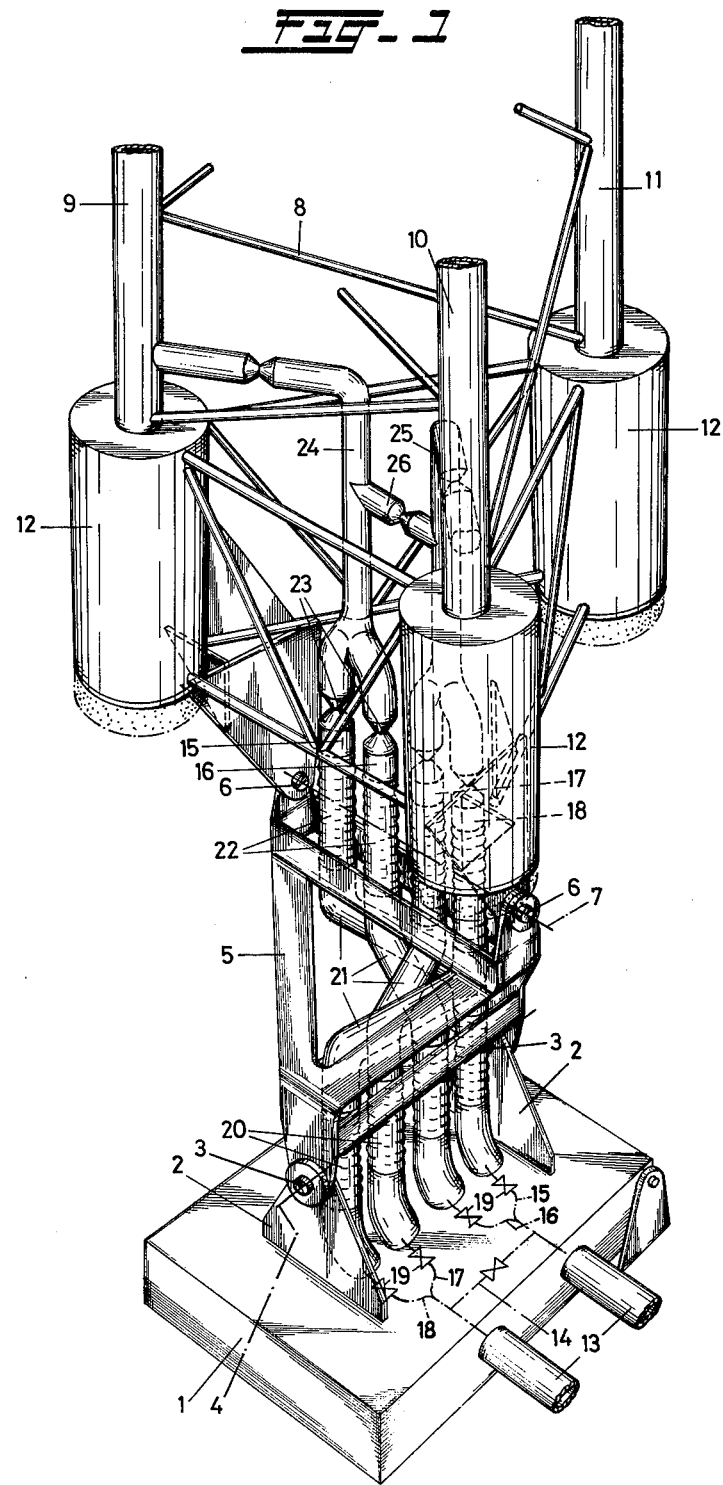
FIG. 1 is a perspective view of the lower part of a pivoting structure below water according to the invention.

On an anchor plate not shown, e.g. of concrete, present on the sea bottom, there is located a metal foundation 1, onto which two bracket plates 2 are mounted, each having at its upper end a hole 3 defining the imaginary pivoting axis 4. Each hole or lug 3 is connected to a corresponding pivoting lug of a pivot piece 5 having at its upper end two pivoting lugs 6 in an imaginary pivoting axis 7 extending also horizontally and being perpendicular to pivoting axis 3. The lugs 6 cooperate with corresponding lugs of a rising structure 8, in this case consisting of a framework of tubes including three rising tubes 9, 10 and 11 at the corners of an equilateral triangle, between which the other tubes of the frame structure extend. Each tube 9, 10, 11 at its lower end has a counterweight 12. Two of the hollow rising tubes 9 and 10 serve for the passage of a fluid which is supplied to foundation 1 by ducts 13.

The rising structure 8 may have floating means at or below the water level in order to keep this structure as much as possible in a vertical position, and furthermore this structure may be connected to all kinds of different devices near the water level as desired. There may be a large buoy connected thereto at the water level, to which ships may be moored, which may take up oil or gas from the column tubes 9 and 10. Together therewith or in lieu thereof there may be below or near the water level, a storage tank for taking up oil or gas, and it is also possible to use the structure as a so-called flare in order to burn undesired products at the top thereof in the atmosphere, e.g. in the initial period when making a production well for oil or gas.

Figure 3:
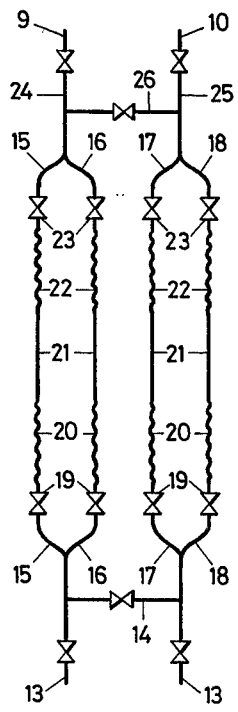
FIG. 3 is a diagram of the ducts extending through the pivoting structure.

According to the diagram of FIG. 3 each duct 13 splits up into two ducts, the left one into ducts 15 and 16 and the right one into ducts 17 and 18. There is a transverse connection 14 between the ducts 13, with a valve therein. The ducts 13 themselves also each have a valve before the point where they are split. Each duct 15 to 18 incl. merges through a valve 19 into a flexible duct part 20, e.g. embodied as a flexible bellows from synthetic rubber with steel annular or helical reinforcements known as such, and past this flexible part 20 each duct merges into a curved and inclined short duct part 21 which leads to a further bellows part 22, from where each duct 15 to 18 incl. leads through a valve 23 to a part where the two ducts 15 and 16 on the one hand and 17 and 18 on the other hand merge into one duct again. The ducts 15 and 16 are combined at a duct 24, which leads through a valve to the hollow column 9 of the structure 8 and the ducts 17 and 18 merge into a duct 25 leading to hollow column 10. A transverse connection 26 with a valve may mutually connect said ducts 24 and 25.

It will be clear from FIG. 1 that each bellow-shaped duct part 20 leads a duct vertically through the pivoting axis 4, and each flexible duct part 22 guides the axis of the concerned duct through the pivoting axis 7 above axis 4. The duct parts 21 between parts 20 and 22 thus connect in an inclined and curved way and said flexible duct parts. It is thus possible for all four ducts 15-18 incl. In the area of the pivoting axes to be bent but they need not become longer or shorter, so that the ducts may be embodied in a rigid and strong way, e.g. mainly from metal, and, as far as the bellows are concerned, the rubber or the like may be reinforced to a considerable extent by metal. It will be clear that it is in principle also possible to use steel bellows for the parts 20 and 22.

Figure 2:
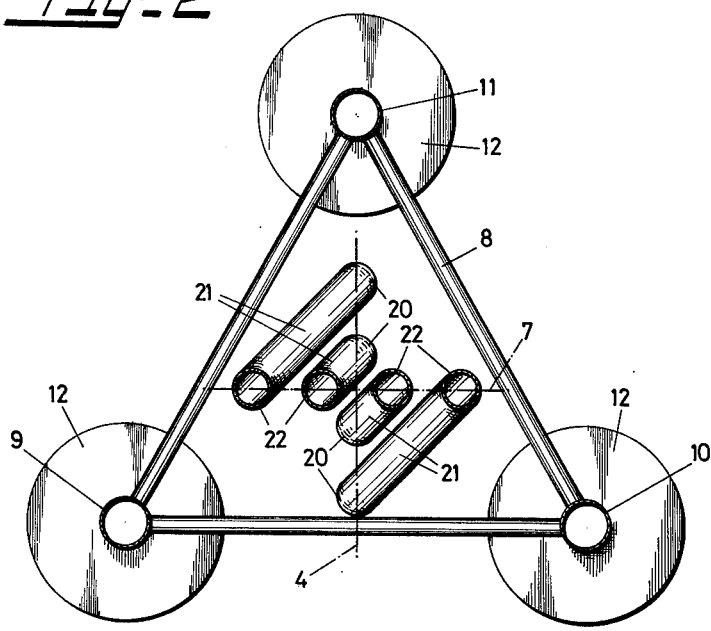
FIG. 2 is a diagrammatic view from above of the four ducts extending through the pivoting structure of FIG. 1.

It is seen in FIG. 2 how the duct parts 20 are positioned in the pivoting axis 4 and the duct parts 22 in the pivoting axis 7, and that the duct parts 21 each extend in a vertical plane, which planes are mutually parallel.

The pivoting body 5 has, as appears from FIG. 1. the shape of an open tetrahedron.

I claim:

1. In a submarine pivot structure for connecting two structures for pivoting relative to each other in plural directions and having a plurality of fluid transport ducts extending between said two structures, the improvement wherein: said pivoting structure comprises means defining two pivot axes which are perpendicular to each other and are spaced from each other at some distance, said plural ducts at each pivot axis extend in a plane passing through one of said axes in side by side position and being perpendicular to the other pivot axis and being positioned substantially perpendicular to said one pivot axis, and said ducts extending as throughgoing separate structural units through both pivot axes and said ducts each including a short inclined connection duct portion between said axes.

2. The structure according to claim 1, wherein portions of said ducts passing through said pivot axes comprise flexible corrugated bellows.

3. The structure according to claim 1 wherein said means defining two pivot axes which are perpendicular to each other and being spaced from each other at some distance comprise members pivoted to each other at two pivot points which define a given pivot axis and are spaced at a distance from each such that the ducts extend between said members and pass through the pivot axis between said pivot points.

4. The structure according to claim 3, wherein one of said members comprises a pivot body having the shape of an open tetrahedron and comprising a pivot point at each corner thereof.

5. The structure according to claim 1, further comprises means for splitting at least one of said ducts between one of said structures and said pivot structure and means for joining said split ducts between said pivot structure and the other of said structures so as to form two parallel flow paths through individual ducts within said pivoting structure and extending through said two pivot axes.

6. The structure according to claim 1, wherein one of said two structures comprises an anchor block or foundation at a sea bottom below the water level and said other of said two structures comprises a column with floating means and storage or discharge means for fluids flowing through the ducts to points near or above the water level.

* * * * *

UNITED STATES PATENT AND TRADEMARK OFFICE
CERTIFICATE OF CORRECTION

PATENT NO. : 4,025,976
DATED : May 31, 1977
INVENTOR(S) : Arie Van Der Landen

It is certified that error appears in the above-identified patent and that said Letters Patent are hereby corrected as shown below:

In the heading, correct the spelling of one word in the name of one of the three corporate assignees:

Koninklijke Fabrieken Penn & [Baudin] Bauduin B. V.

*Signed and Sealed this*

*Eighteenth* Day of *April 1978*

[SEAL]

*Attest:*

RUTH C. MASON
*Attesting Officer*

LUTRELLE F. PARKER
*Acting Commissioner of Patents and Trademarks*